United States Patent [19]
Gugliotti et al.

[11] Patent Number: 6,032,425
[45] Date of Patent: Mar. 7, 2000

[54] FLOORING SYSTEM

[75] Inventors: James M. Gugliotti; David P. Gugliotti, both of Plantsville, Conn.

[73] Assignee: Gugliotti Associates, Inc., Plantsville, Conn.

[21] Appl. No.: 09/072,670

[22] Filed: May 6, 1998

Related U.S. Application Data

[60] Provisional application No. 60/074,061, Feb. 9, 1998.

[51] Int. Cl.[7] .................................................... E04F 15/00
[52] U.S. Cl. ......................... 52/480; 52/403.1; 52/489.1; 52/582.1; 52/592.1; 403/334; 403/335
[58] Field of Search .................................. 52/480, 489.1, 52/582.1, 592.1, 650.3, 653.1, 391, 392, 403.1; 403/333, 334, 335, 336

[56] References Cited

U.S. PATENT DOCUMENTS

| | | | |
|---|---|---|---|
| 1,682,210 | 4/1928 | Belrose | 52/582.1 |
| 1,696,104 | 12/1928 | Seward et al. | 52/489.1 |
| 1,710,610 | 4/1929 | Duke | 52/582.1 X |
| 2,014,841 | 9/1935 | Heeren et al. | 52/489.1 |
| 2,019,692 | 11/1935 | Mueller . | |
| 2,102,086 | 12/1937 | Mueller . | |
| 2,547,347 | 4/1951 | Stoldt | 52/489.1 |
| 2,635,450 | 4/1953 | Orzel . | |
| 2,822,585 | 2/1958 | Baruch . | |
| 2,834,065 | 5/1958 | Mueller . | |
| 3,619,964 | 11/1971 | Passaro et al. | 52/391 X |
| 4,538,392 | 9/1985 | Hamar et al. | 403/336 X |
| 5,016,413 | 5/1991 | Counihan | 52/391 |
| 5,251,996 | 10/1993 | Hiller et al. | 52/582.1 X |
| 5,433,052 | 7/1995 | Niese | 52/480 X |
| 5,497,590 | 3/1996 | Counihan | 52/385 |
| 5,511,353 | 4/1996 | Jones | 52/489.1 X |
| 5,609,000 | 3/1997 | Niese . | |
| 5,706,621 | 1/1998 | Pervan | 52/480 X |
| 5,757,357 | 5/1998 | Piller | 52/747.11 |

FOREIGN PATENT DOCUMENTS 1708805 9/1969 Germany ............................. 52/582.1

*Primary Examiner*—Beth Auber
*Assistant Examiner*—Brian E. Glessner
*Attorney, Agent, or Firm*—Arent Fox

[57] ABSTRACT

A portable floor system has a plurality of modular floor sections each formed by floorboards and a subfloor for support and each having either a tongue or a groove at its periphery. A plurality of spaced-apart floor joists extend downwardly from the subfloor. The tongues and grooves are matingly arranged. Mounted to the undersurface of each floor section are one or more wedging clips configured to cooperate with a clip of an adjacent section to interconnect adjacent floor sections.

10 Claims, 4 Drawing Sheets

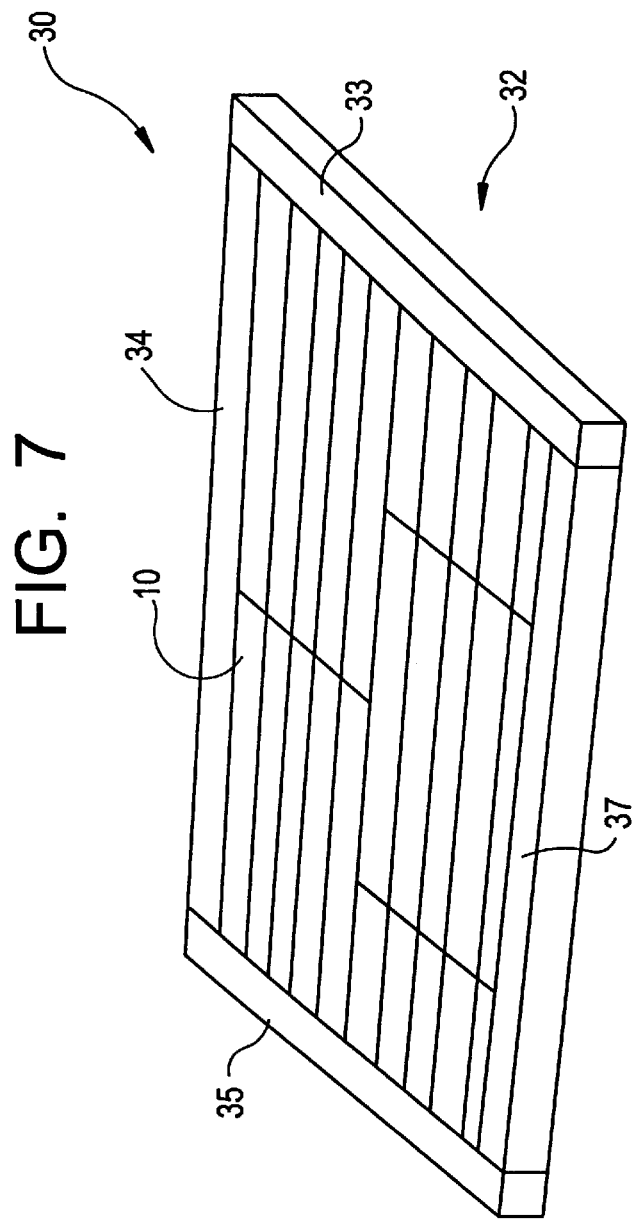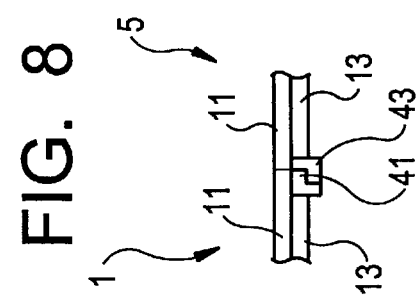

FLOORING SYSTEM

This application claims the benefit of the filing date of the prior provisional application, Ser. No. 60/074,061, filed on Feb. 9, 1998.

FIELD OF INVENTION

The present invention is directed to a flooring system and, in particular, an athletic flooring system employing a plurality of flooring sections, each of which utilizes wedging clips for secure longitudinal section attachment.

BACKGROUND ART

In the prior art, various types of modular flooring systems have been proposed. U.S. Pat. No. 2,635,450 to Orzel discloses a slab construction for buildings. L-shaped side lugs extend from slab side faces of flooring slabs for interlocking with adjacent flooring slabs.

Other flooring construction uses metal clips as shown in U.S. Pat. No. 1,710,610 to Duke. Tongue and groove construction is shown in U.S. Pat. Nos. 2,019,692 and 2,102,806 to Mueller. U.S. Pat. No. 2,834,065 to Mueller also utilizes anchor plates or clips around a dance floor periphery.

The flooring systems noted above still lack means to facilitate a tight abutting edge-to-edge engagement when floor panels are moved length-wise relative to each other and into assembly. Consequently, a need has developed to provide an improved flooring system which attains this purpose.

SUMMARY OF INVENTION

Accordingly, it is a first object of the present invention to provide an improved portable flooring system.

Another object of the present invention is to provide a flooring system which is readily adaptable as an athletic floor, particularly for use over ice.

A still further object of the present invention is to provide a flooring system that is easily and quickly assembled.

One other object of the present invention is to provide a flooring system which allows for loose alignment of floor sections prior to forming a tight fitting assembly.

Other objects and advantages of the present invention will become apparent as a description thereof proceeds.

In satisfaction of the foregoing objects and advantages, the present invention provides a portable flooring system section comprising a flooring and at least two connectors arranged along side surfaces of the section. Each connector is configured to interface with a connector on an adjacent surface of a floor section to interlock the sections together to form a completed floor assembly. Each section also has at least one wedging clip having a wedging plate angled with respect to a longitudinal axis of one of the connectors. The wedging clip can be mounted to each floor section such that wedging clips from adjacent floor sections engage each other and guide the connectors of adjacent floor sections together for assembly.

Each floor section can have a subfloor supporting the flooring, the flooring preferably made from maple. The subfloor can be supported by floor members extending therefrom and each floor member can have a resilient base. The surface of the wedging plate is preferably generally perpendicular to a surface of the flooring surface but can also be angled with respect to the surface floor. Each wedging plate can also extend from within a peripheral edge of the floor section to an outside of the peripheral edge.

In a preferred embodiment, the present invention comprises a floor assembly, preferably for use in athletic endeavors, which is formed from a plurality of modular floor sections, some being square and some being rectangular. Each section comprises a floor formed by floorboards, the floorboards being mounted on the subfloor. Preferably, the floor is a tongue and groove construction and the subfloor is made from plywood. Extending from the subfloor are floor joists mounted at spaced-apart intervals. The floor joists extend from the subfloor surface opposite the surface adjacent the floorboards. Other materials can be used as would be known in the art.

Preferably, at least a portion of the periphery of each floor section has alternating tongue and groove construction. This tongue and groove construction allows the floor sections to be attached together. More particularly, the tongue and groove members are made of polyurethane plastic and extend at least along the longitudinally extending outer edges of the subfloor so that adjacent panels can be maintained in a co-planar relationship to each other.

Mounted on the undersurface of each floor section are wedging clips. The clips of adjacent sections cooperate in wedging engagement with each other to move the adjacent panels into and abutting edge-to-edge relationship. The wedging clips maintain this edge-to-edge relationship as the floor sections are moved longitudinally relative to each other for assembly.

The invention includes not only the individual floor section sections but also the method of assembly using the unique wedging clips and the entire floor assembly.

BRIEF DESCRIPTION OF THE DRAWINGS

References now made to the drawings and photographs of the invention where:

FIG. 7 shows an alternative floor section mating arrangement; and

FIG. 8 shows an alternative connection between sections of the invention.

DESCRIPTION OF PREFERRED EMBODIMENTS

Figure 1:
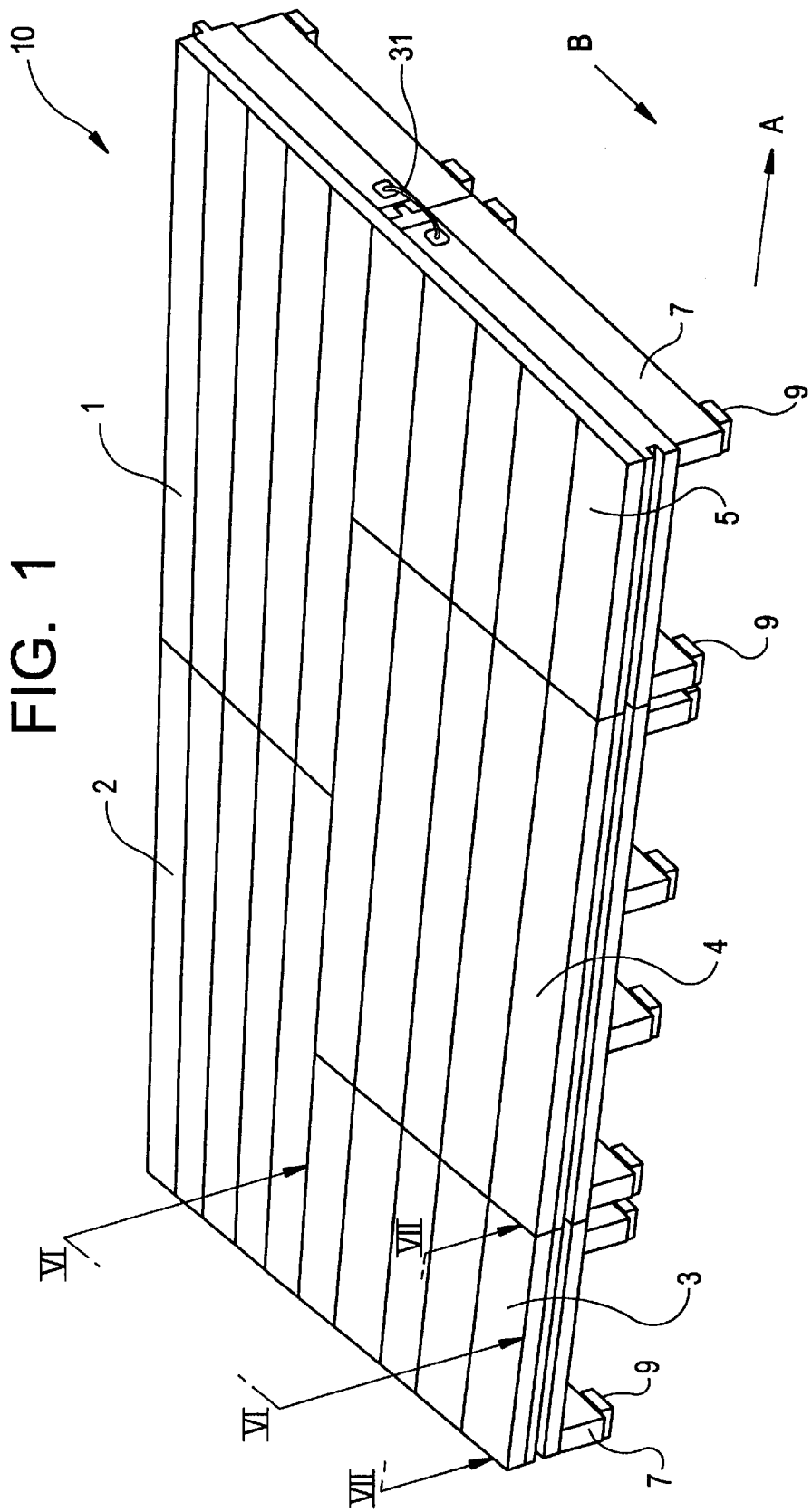
FIG. 1 is a perspective view of one embodiment of the inventive flooring system.
Figure 2:
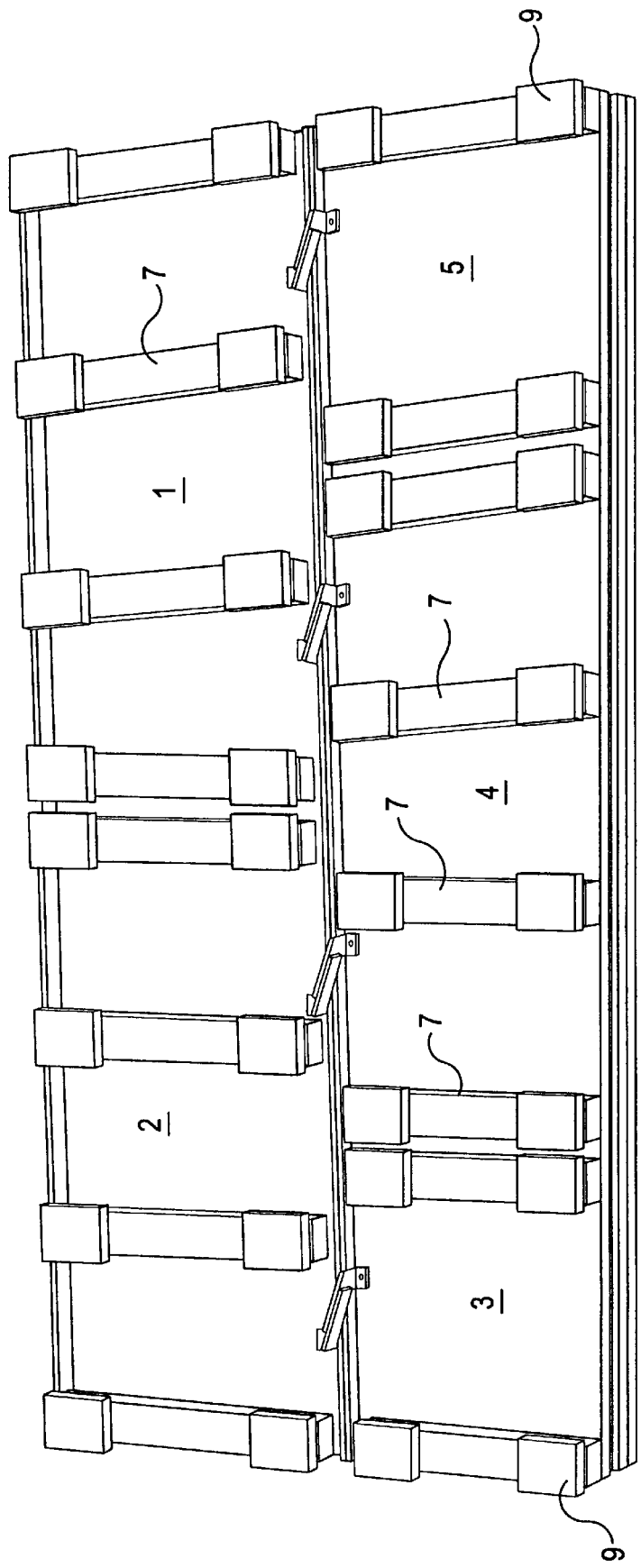
FIG. 2 is a perspective view of the underside of one embodiment of the inventive flooring system.

One embodiment of the invention flooring system is designated by the reference numeral 10 in FIGS. 1 and 2 and is seen to depict floor sections, 1, 2, 3, 4 and 5. Sections 1, 2 and 4 are elongated rectangular sections with sections 3 and 5 being square. For description purposes, the arrow A shown in FIG. 1 designates the longitudinal direction with Arrow B being the transverse direction. The sections 1, 2 and 4 are arranged in a staggered relationship to each other. The square sections 3 and 5 are used as end fillers in the assembly where necessary. It should be understood that more than two of the elongated panels could be linked longitudinally. In addition, more than one set of the sections 1–5 could be linked transversely.

The sections are supported by spaced apart floor joists 7, the floor joists 7 including, if desired, resilient pads 9.

The sections 1–5, are equipped with tongue and groove construction in the longitudinal direction and, where appropriate, in the transverse direction. For example, section 5 needs only one tongue or groove section for transverse connection whereas section 4 would require tongue and groove connections for longitudinal and transverse attachment.

FIG. 2 shows the underside of an assembled system showing the locations of the joists 7, the resilient pads 9 and a plurality of wedging clips 23 and 25 used to facilitate longitudinal attachment of the various sections.

FIG. 1 also shows a locking mechanism 31 shown attached to the peripheral side faces of sections 1 and 3 to securely lock the sections in longitudinal attachment. The locking mechanism shown has a pivoting connection to section 1 and a locking assembly attached to section 3. Of course, any known locking or securing mechanism could be used to facilitate connection at the peripheral sides of the assembly flooring system. Another locking mechanism can be utilized at the end where sections 2 and 3 meet.

Figure 3:
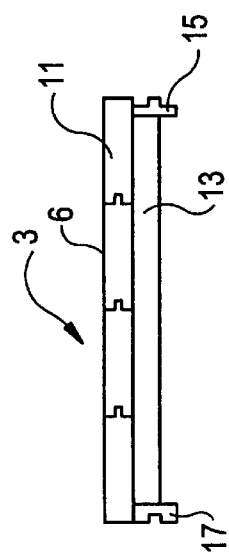
FIG. 3 is a sectional view along the line VI—VI shown in FIG. 1.
Figure 4:
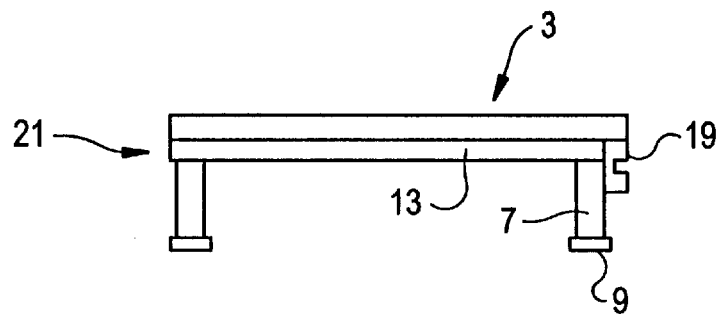
FIG. 4 is a sectional view along the line VII—VII of FIG. 1.

FIGS. 3 and 4 show sectional views of section 3. FIG. 3 shows a transverse sectional view illustrating the tongue and groove floor construction 11, subfloor 13, tongue connector 15 and groove connector 17. When assembled, the tongue connector 15 would interface with an adjacent groove connector of an adjacent floor section. Likewise, the groove connector 17 could interface with an adjacent tongue connector.

FIG. 4 shows the floor section 3 with a transverse tongue connector 19. In the embodiment of FIG. 1, the face 21 of section 3 does not require a groove connector. However, if the flooring system 10 used more than two longitudinally arranged elongated sections 1 and 2, the square floor section 3 could be constructed with both tongue and groove connectors to facilitate attachment to adjacent sections. In addition, if desired, the groove connector 19 could be replaced with a tongue connector for mating with an adjacent groove connector.

The various section components such as the floor joists 7, the flooring 11, the pads 9, and the like can be fixed together by conventional attachment, nails, adhesives, screws, combinations thereof or the like.

Figure 5:
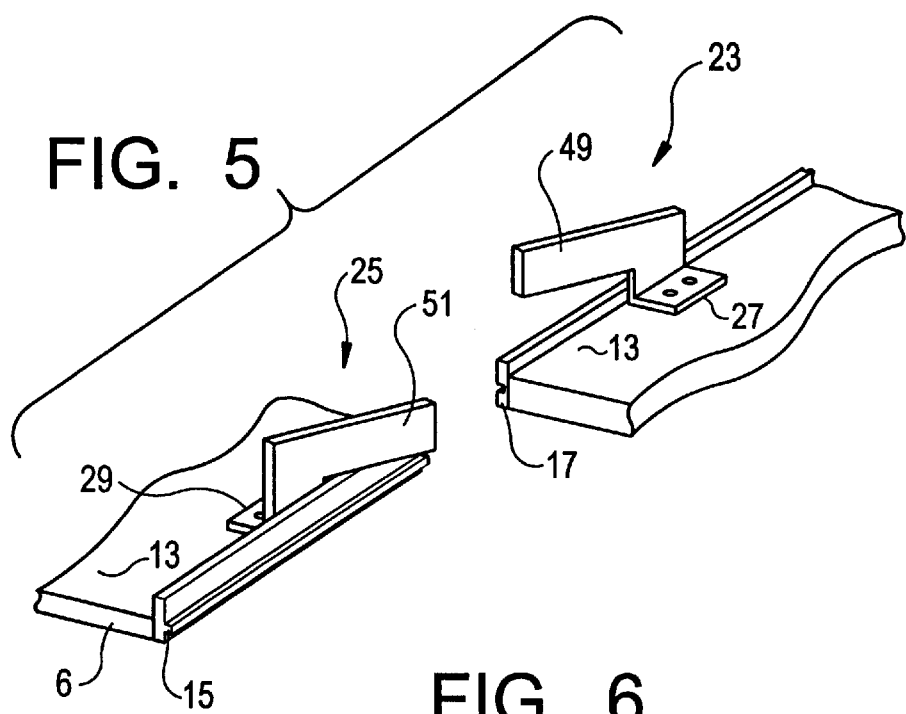
FIG. 5 shows the wedging clips of the invention in an unwedged state.
Figure 6:
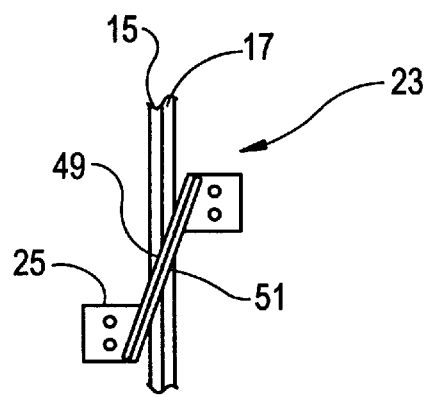
FIG. 6 shows a top view of the wedging clips in a wedged state.

The unique wedging clips 23 and 25 of the invention are shown in more detail in FIGS. 5 and 6. The wedging clips 23 and 25 have respective L-shaped bases 27 and 29, each base being designed to attach to the subflooring 13. Each of the wedging clips 23 and 25 have a wedge plates 49 and 51, respectively. The plates are angled with respect to the longitudinal direction "A". More particularly, the plates are acutely angled with respect to a vertical plane disposed along direction "A". The plate surfaces 32 and 34 are also angled with respect to the surface 6 of the flooring 11. Although the angling with respect to surface 6 is shown as generally perpendicular, other angling could be used.

During assembly of the floor sections, the section with wedging clip 23 is moved toward the section having wedging clip 25, or vice versa. The wedging plates 49 and 51 begin to overlap and subsequently contact each other. The contact between the plates 49 and 51 facilitates the edge-to-edge abutting of the tongue connector 15 and the groove connector 17. Since the plates 49 and 51 are elongated in shape, a mere sliding action of either or both of the wedging clips 23 and 25 will form a wedging engagement and a tight fit between the two sections. With the wedged engagement between the two sections, more sections can be attached together, either longitudinally or transversely. When the assembly is complete, the end lock 31 shown in FIG. 1 can be locked to assure the longitudinal connection between the various sections.

It should be understood that the wedging clips 23 and 25 shown in FIGS. 5 and 6 are exemplary and other designs could be used providing the wedging action described above is maintained.

FIG. 7 shows another embodiment of the inventive flooring system designated by the reference numeral 30. In this embodiment, a frame 32 surrounds the system 10. The frame comprises frame members 33, 34, 35 and 37. Connection between the various frame members can be any conventional mode of fastening or attachment. In the FIG. 7 embodiment, the frame 32 more securely surrounds the flooring system 10 to prevent any transverse or longitudinal misalignment. If so desired, only the frame members 33 and 37 could be used to prevent transverse misalignment since the locking mechanism 31 disclosed in FIG. 1 could be solely utilized on the transverse ends of the system to prevent longitudinal misalignment.

The inventive flooring system is ideally suited for athletics but can be used for any purpose. It is particularly useful in arenas or the like requiring a quick assembly of a floor.

In addition, while tongue and groove construction is illustrated, other types of attachment could be used, providing these types still permit the sliding engagement of sections described above and the wedging action of the clips 23 and 25. For example with reference to FIG. 8, an overlapping joint could be used wherein a connector lip 41 from one section abuts a lip 43 from another section.

As such, an invention has been disclosed in terms of preferred embodiments thereof which fulfills each and every one of the objects of the present invention as set forth above and provides a new and improved, portable flooring system and one or more sections therefor.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A portable flooring system comprising:

a) a plurality of flooring sections comprised of flooring material, each flooring section having four side surfaces, a top flooring surface and an undersurface, and at least two connectors, one of said at least two connectors being a tongue and one of said at least two connectors being a groove, said tongue being designed to be opposing in dimensions with said groove such that said tongue of one flooring section fits into said groove of another flooring section, each connector arranged along a side surface and having a longitudinal axis and a transverse axis of orientation, said plurality of flooring sections being arranged in an opposing manner such that a side of a flooring section having a groove is adjacent to a side of another flooring section having a tongue;

b) each flooring section further including at least one wedging clip mounted to the undersurface of said flooring section, each said at least one wedging clip having an identical configuration comprising a wedging plate, substantially an entirety of said wedging plate being acutely angled with respect to the longitudinal axis of one of the at least two connectors so that said at least one wedging clip engages with another wedging clip from an adjacent flooring section thereby guiding the opposing connectors of two adjacent flooring sections together in interlocking engagement when assembling the portable flooring system such that said portable flooring system formed from assembly of said plurality of flooring sections is uniformly flat on said top flooring surface.

2. The portable flooring system of claim 1, wherein each of the plurality of flooring sections has a subfloor supporting said flooring material.

3. The portable flooring system of claim 1, wherein the flooring material is maple.

4. The portable flooring system of claim 2, wherein the subfloor is supported by a plurality of floor members extending therefrom, each of said plurality of floor members has a resilient base.

5. The portable flooring system of claim 1 wherein one of two adjacent side surfaces of adjacent flooring sections has a tongue connector and a second one of two adjacent flooring sections has a groove connector.

6. The portable flooring system of claim 1, wherein the plurality of flooring sections are arranged both longitudinally and transversely to form an athletic floor having a peripheral edge and at least one longitudinal joint, and wherein a locking device is located at each intersection of the at least one longitudinal joint and the peripheral edge to lock the plurality of flooring sections together forming the peripheral edge longitudinal joint.

7. The portable flooring system of claim 1, wherein a surface of each wedging plate is generally perpendicular to a surface of the top flooring surface.

8. A portable flooring system comprising:
 a) a plurality of four sided flooring sections, each of said plurality of flooring sections having a top flooring surface and an undersurface mounted atop a subfloor and at least two connectors, each connector arranged along one of the sides of said four sided flooring section and having a longitudinal axis and a transverse axis, each connector being one of a tongue connector or a groove connector, said tongue connector being designed to be opposing in dimensions with said groove connector such that said tongue connector of one of said flooring sections fits into said groove connector of another of said flooring sections;
 b) a plurality of floor members supporting the subfloor of each four sided flooring section; and
 c) each of said plurality of four sided flooring sections further including at least one wedging clip, each wedging clip having an identical configuration comprising an L-shaped base portion mounted to and coextensive with the undersurface of said flooring section and a wedging plate extending from the
 d) L-shaped base portion and being wherein substantially the entire wedging plate is acutely angled with respect to the longitudinal axis of one of the connectors so that said at least one wedging clip engages with another wedging clip from an adjacent flooring section thereby guiding the opposing connectors of said adjacent flooring section together during assembly of the portable flooring system such that said portable flooring system formed from assembly of said plurality of four sided flooring sections is uniformly flat on said top flooring surface.

9. The portable flooring system of claim 8, further comprising a locking device to lock longitudinally connected flooring sections together at peripheral edges thereof.

10. A portable flooring system comprising:
 a) a plurality of flooring sections, each flooring section having a top surface, an undersurface, four side surfaces, and at least two connectors, wherein a first of the two connectors mates with a second of the two connectors such that the flooring sections are mated along at least one of a longitudinal axis and a transverse axis of orientation;
 b) each flooring section further comprising at least one wedging clip mounted to the undersurface and disposed only along a longitudinal edge of said flooring section, each said at least one wedging clip having an identical configuration comprising;
 a base portion coextensive with the flooring section, and
 a wedging plate extending from the base portion wherein substantially an entirety of the wedging plate is disposed at an acute angle with respect to the longitudinal axis,
 wherein a first wedging plate attached along a longitudinal edge of a first flooring section is slidably engageable with a second wedging plate attached along a longitudinal edge of a second flooring section to create a tight fit between the first and second flooring sections.

* * * * *